United States Patent
Enns et al.

(10) Patent No.: US 9,706,707 B2
(45) Date of Patent: Jul. 18, 2017

(54) CROP HARVESTING MACHINE WITH A HEADER SEPARABLE FROM A TRACTOR

(71) Applicant: Macdon Industries Ltd., Winnipeg (CA)

(72) Inventors: John Edward Enns, East St. Paul (CA); Arvinder Singh Jabal, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 14/863,992

(22) Filed: Sep. 24, 2015

(65) Prior Publication Data
US 2017/0086367 A1  Mar. 30, 2017

(51) Int. Cl.

| | |
|---|---|
| *B60D 1/62* | (2006.01) |
| *B60R 16/00* | (2006.01) |
| *A01D 34/03* | (2006.01) |
| *A01D 69/03* | (2006.01) |
| *A01D 34/38* | (2006.01) |
| *A01D 101/00* | (2006.01) |

(52) U.S. Cl.
CPC .......... *A01D 34/03* (2013.01); *A01D 34/38* (2013.01); *A01D 69/03* (2013.01); *A01D 2101/00* (2013.01)

(58) Field of Classification Search
CPC .... B60D 1/62; B60D 1/64; B60D 7/00; E02F 9/2275; Y10T 137/6921
USPC .................. 137/899, 615; 172/813; 280/421; 56/14.9
See application file for complete search history.

(56) References Cited

U.S. PATENT DOCUMENTS

| | | | | |
|---|---|---|---|---|
| 2,619,888 | A * | 12/1952 | Young .................... | B60K 17/10 172/316 |
| 2,673,093 | A * | 3/1954 | Silver .................... | A01B 61/02 172/316 |
| 3,279,822 | A * | 10/1966 | Orendorff .............. | A01B 63/22 172/316 |
| 3,625,251 | A * | 12/1971 | Nelson .................... | B60D 1/62 137/614.02 |
| 3,722,916 | A * | 3/1973 | Muntjanoff .............. | B60D 1/62 248/75 |
| 3,872,881 | A * | 3/1975 | Miller ...................... | E02F 3/65 137/355.17 |
| 3,882,886 | A * | 5/1975 | Ely .......................... | E02F 3/65 137/355.17 |

(Continued)

*Primary Examiner* — Árpád Fábián-Kovács
(74) *Attorney, Agent, or Firm* — Adrian D. Battison; Ade & Company Inc.

(57) ABSTRACT

In a swather a support arm is attached to the header to carry the heavy hydraulic hoses which are connected to the tractor for supplying the drive fluid to the hydraulic system of the header. The support arm is articulated so as to accommodate the up-and-down and twisting movement of the header relative to the tractor during harvesting action and this supported to prevent collapse when the hoses are disconnected from the tractor manifold. The support arm is attached at the rear to the tractor preferably at the wheel strut by a releasable ball joint coupling. From the coupling at the wheel strut, there is a free portion of the hydraulic hoses which extends to the manifold at the tractor where the ends of the hoses are attached to manually graspable handle portions which can be lifted away and the attached to a bracket on the support arm.

19 Claims, 5 Drawing Sheets

(56) References Cited

U.S. PATENT DOCUMENTS

| | | | | |
|---|---|---|---|---|
| 3,885,816 A | * | 5/1975 | Miller | B60D 1/62 137/355.17 |
| 3,901,270 A | | 8/1975 | Smith | |
| 4,077,433 A | * | 3/1978 | Maldavs | B60D 1/64 137/614.04 |
| 4,156,436 A | | 5/1979 | Hawk | |
| 4,304,077 A | * | 12/1981 | Muller | E02F 3/36 248/68.1 |
| 4,368,899 A | * | 1/1983 | Smalley | B60D 1/04 280/421 |
| 4,582,281 A | * | 4/1986 | Van Camp | B25J 9/06 248/49 |
| 4,625,936 A | * | 12/1986 | Hadden, Sr. | B25J 9/06 138/120 |
| 4,658,854 A | * | 4/1987 | Hopkins | F16L 3/223 137/355.17 |
| 4,738,463 A | * | 4/1988 | Poore | A01B 59/062 280/420 |
| 5,082,217 A | * | 1/1992 | Parker | F16L 3/003 248/75 |
| 5,713,592 A | | 2/1998 | Dunell | |
| 6,095,181 A | * | 8/2000 | Irwin | F16L 3/015 137/351 |
| 6,336,280 B1 | * | 1/2002 | Haigh | E02F 3/183 37/352 |
| 6,378,279 B1 | * | 4/2002 | Smith | A01B 71/066 137/355.17 |
| 7,017,676 B2 | | 3/2006 | Neufeld | |
| 7,143,839 B2 | * | 12/2006 | Neufeld | A01B 59/042 172/776 |
| 7,159,687 B2 | | 1/2007 | Dunn | |
| 7,182,146 B2 | * | 2/2007 | Erickson | A01B 59/042 172/776 |
| 7,197,865 B1 | | 4/2007 | Enns | |
| 7,347,277 B2 | | 3/2008 | Enns | |
| 7,373,769 B2 | | 5/2008 | Talbot | |
| 7,472,533 B2 | | 1/2009 | Talbot | |
| 7,540,133 B2 | * | 6/2009 | Zacharias | A01B 59/002 248/74.2 |
| 7,721,830 B2 | | 5/2010 | Dunn | |
| 7,918,076 B2 | | 4/2011 | Talbot | |
| 7,958,706 B2 | | 6/2011 | Remillard | |
| 8,020,648 B2 | | 9/2011 | Otto | |
| 8,225,903 B2 | | 7/2012 | Dunn | |
| 8,245,489 B2 | | 8/2012 | Talbot | |
| 8,505,570 B2 | * | 8/2013 | Wimmer | B66C 13/12 137/355.17 |
| 8,668,173 B2 | * | 3/2014 | Knobloch | A01C 23/008 248/68.1 |
| 9,382,685 B2 | * | 7/2016 | Maki | E21C 47/00 |
| 9,458,606 B2 | * | 10/2016 | Ditzler | F16C 11/045 |
| 9,549,498 B2 | * | 1/2017 | Olivares | A01B 73/005 |
| 2005/0247359 A1 | * | 11/2005 | Hiser | F16K 27/003 137/879 |
| 2007/0089391 A1 | * | 4/2007 | MacGregor | A01B 71/06 56/11.9 |
| 2010/0066076 A1 | * | 3/2010 | Lundgren | E02F 3/3654 285/26 |
| 2011/0198840 A1 | * | 8/2011 | Sorbi | F16L 37/16 285/81 |
| 2016/0369923 A1 | * | 12/2016 | Danelli | E02F 9/2275 |

\* cited by examiner

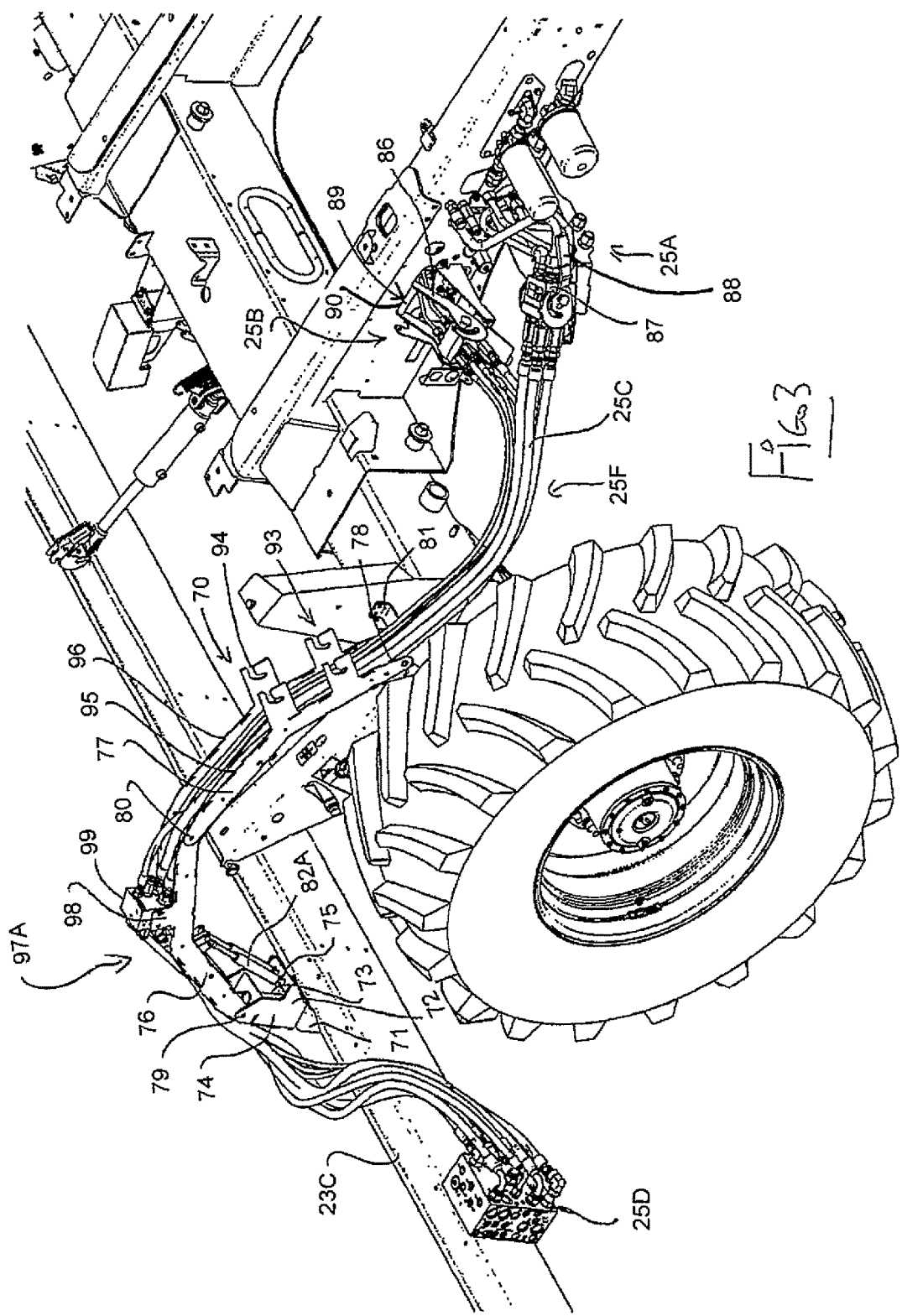

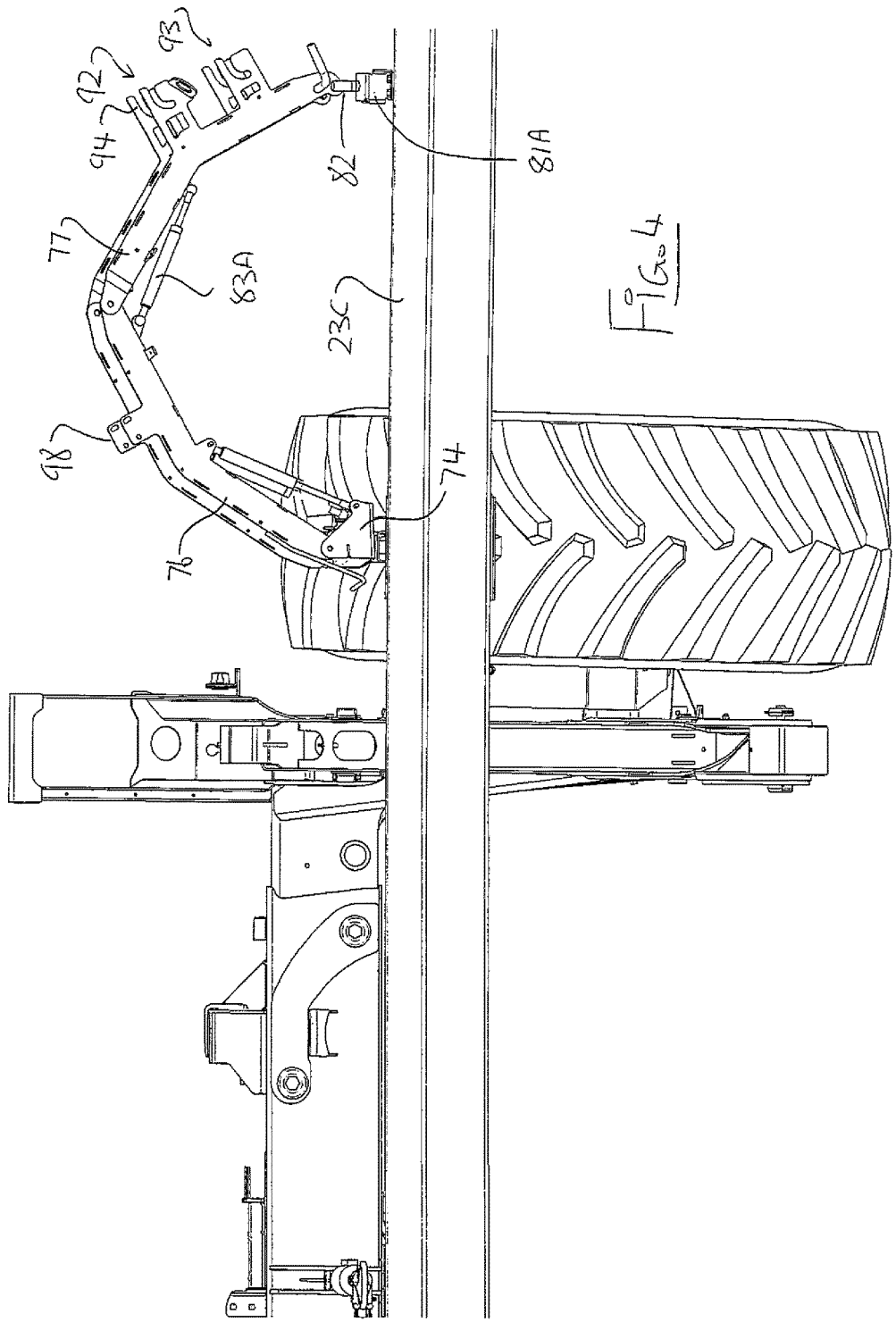

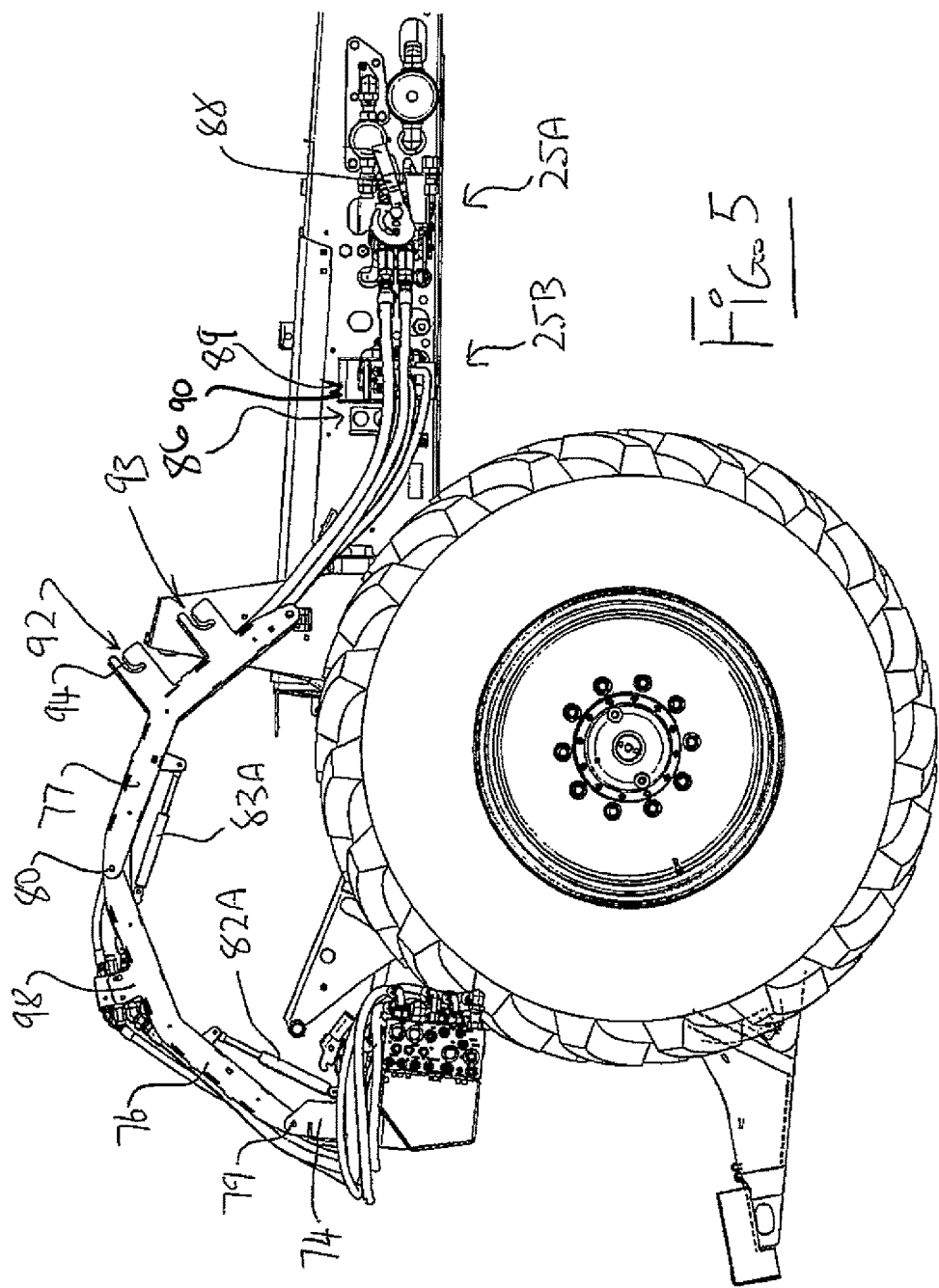

CROP HARVESTING MACHINE WITH A HEADER SEPARABLE FROM A TRACTOR

This invention relates to a crop harvesting machine including a header and a tractor where the header is separable from the tractor. The tractor may be a swather tractor which simply caries the header to form a swath or may be a combine harvester which also carries out a separation process.

BACKGROUND OF THE INVENTION

Reference is made to the following patents and applications by the same assignee, the disclosure of each of which provides further details which may be used in the machines disclosed herein:

U.S. Pat. No. 8,245,489 (Talbot) issued Aug. 21, 2012 which discloses a combine harvester where the header is carried on gauge wheels.

U.S. Pat. No. 8,225,903 (Dunn) issued Jul. 24, 2012 which discloses a tractor of the type suitable for use herein where the tractor includes a suspension system.

U.S. Pat. No. 8,020,648 (Otto) issued Sep. 20, 2011 which discloses a tractor of the type suitable for use herein where the tractor has a rear suspension.

U.S. Pat. No. 7,958,706 (Remillard) issued Jun. 14, 2011 which discloses a tractor of the type suitable for use herein where the tractor includes a reel speed control.

U.S. Pat. No. 7,918,076 (Talbot) issued Apr. 5, 2011 which discloses a header of the type suitable for use herein where the header has three sections which include a balance of lifting forces across the three sections.

U.S. Pat. No. 7,721,830 (Dunn) issued May 25, 2010 which discloses a tractor of the type suitable for use herein with steering control.

U.S. Pat. No. 7,373,769 (Talbot) issued May 20, 2008 which discloses a header with a wear shield under the cutter bar.

U.S. Pat. No. 7,347,277 (Enns) issued Mar. 25, 2008 which discloses a header with a self-contained transport system.

U.S. Pat. No. 7,472,533 (Talbot) issued Jan. 6, 2009 which discloses a header with a cutter bar and draper with a seal between the draper and cutter bar.

U.S. Pat. No. 7,159,687 (Dunn) issued Jan. 9, 2007 which discloses a tractor of the type suitable for use herein where the tractor carries a header across a front face thereof for movement across the field for forming a swath from a standing crop where the tractor can be reversed in direction for transport.

U.S. Pat. No. 7,197,865 (Enns) issued Apr. 3, 2007 which discloses a header for mounting across a front face of the tractor above for movement across the field for forming a swath from a standing crop where the header includes ground wheels movable from field positions to a transport position where the header can be turned through 90 degrees and pulled by the tractor in a longitudinal direction behind the tractor.

A machine of this type generally includes a crop header for cutting a standing crop including a header frame, a cutter extending across a front cutter bar of the header frame for cutting the crop, and a transport system operable to transport the crop to a central discharge opening of the header so as to form a swath.

Typically the cutter is a sickle knife of the type described in the above patents but in some cases other types of cutter can be used. In many cases the transport device is a draper but other types of transport including augers can be used.

The machine further includes a tractor or other vehicle for carrying the header including a tractor frame having a first end and a second end, ground wheels for supporting the tractor in movement across the ground including a pair of transversely spaced first wheels at the first end, a mounting assembly at the first end of the tractor frame for supporting the header, and a lift arrangement for raising and lowering the mounting assembly.

SUMMARY OF THE INVENTION

According to a first aspect of the invention there is provided a crop harvesting machine comprising:

a tractor having longitudinally opposed first and second ends;

a driver cabin on the tractor;

ground wheels rotatably supported on the tractor frame for movement of the tractor in a working direction across the ground which carries a crop to be harvested;

an engine and hydraulic pump mounted on the tractor for providing a pressurized fluid output;

a header having an elongate support structure arranged across a width of the tractor extending from one end of the header to an opposed end of the header;

the header including a cutter bar extending across a width of the header for cutting a standing crop as the header is moved over the ground;

the header including a feeding system for carrying the cut crop along the header frame for collecting at a discharge area of the header;

the header including a hydraulic header drive system for driving at least the cutter knife and the feed system;

a mounting assembly carrying the header at a position forward of the first end of the tractor so as to support the header in movement over the ground as the tractor is moved in the working direction;

the mounting assembly mounting the header on the tractor for movements of the header relative to the tractor at least in a first direction upwardly and downwardly and in a second direction of twisting movement where said one end of the header is movable upwardly and downward relative to said opposed end;

the mounting assembly being releasable for disconnection of the header from the tractor;

a flexible conduit assembly having one or more conduits having an extent from the tractor to the header for connecting the pressurized fluid from the tractor to the hydraulic header drive system;

and a conduit support member for supporting the conduit assembly in at least part of the extent from the tractor to the header;

the conduit support member being connected at one end to one of the tractor and the header and being connected by a releasable coupling at the other end to the other of the tractor and the header;

the conduit support member including articulation components providing articulation of said one end relative to the other end so as to accommodate said movements of the header relative to the tractor;

the conduit support member including support components providing support to the conduit assembly to prevent collapse thereof when said other end is disconnected from said other of the tractor and the header for disconnection of the header.

The tractor is typically a swather tractor where the header is a swather header for collecting the cut crop or discharge into a swath behind the tractor. However the same arrangement can also be used on other constructions including a combine harvester.

In general therefore the arrangement as described in more detail hereinafter provides a support arm attached to the header which is arranged to carry the heavy hydraulic hoses which are connected to the tractor for supplying the drive fluid to the hydraulic system of the header. Support arm is articulated so as to accommodate the up-and-down and twisting movement of the header relative to the tractor during harvesting action. The support arm is attached at the rear to the tractor preferably at the wheel strut by a releasable ball joint coupling. From the coupling at the wheel strut, there is a free portion of the hydraulic hoses which extends to the manifold or individual couplers at the tractor where the ends of the hoses are attached to manually graspable handle portions which can be lifted away and the attached to a bracket on the support arm.

In some cases the conduit assembly includes a manifold for disconnection of ends of a plurality of conduits of the conduit assembly but the arm design herein could also work using individual couplers in place of the multi-couplers or manifold. Individual couplers would be cheaper but not as quick to connect and also would require a different storage method when uncoupled.

Preferably the conduit assembly includes a portion of the plurality of conduits extending freely beyond the releasable coupling and the conduit support member includes at least one bracket for supporting the free ends of the conduits when disconnected.

In some cases the manifold includes at least two components and there are provided at least two separate brackets at spaced positions on the conduit support member each for a receiving a respective one of the components. However it is not required that there be two multi-couplers on the arm. This could be done with one very large one but two smaller couplers are more convenient and cost effective.

Preferably each of the components includes a hand graspable handle member and each of the brackets is arranged to receive the hand graspable handle member looped or hooked thereon for example using a transverse bar where the bracket defines a slot into which the bar engages.

Preferably the releasable coupling comprises a ball joint which allows swivelling of the releasable end and has a connection which allows the release of the coupling.

Preferably the articulation components provide pivot members pivotal about two orthogonal axes, typically an upright axis and a transverse axis.

Preferably the articulation component provides a mounting base, a first portion of the conduit support member extending from the mounting base and pivotal relative thereto about a first transverse axis and a second portion connected at a distal end of the first portion and pivotal relative thereto about an axis parallel to the first axis. The support components then resist the movement about the pivot so as to hold the portions in place against collapse about the pivot axes so that the support components can comprise damper members such as gas springs or wire springs which provide a resistance to collapse.

Preferably the conduit support member comprises a channel defined by a base and side walls within which the conduit sits.

Preferably the conduit support member is arched.

Preferably the conduit support member is connected between a main support beam of the header and a front wheel support strut of the tractor.

Preferably the conduit support member is permanently connected at said one end to the header and there is provided a releasable coupling on the header for receiving and locating the other end of the conduit support member when disconnected from the tractor.

According to a second aspect of the invention there is provided a crop harvesting machine comprising:
a tractor having longitudinally opposed first and second ends;
a driver cabin on the tractor;
ground wheels rotatably supported on the tractor frame for movement of the tractor in a working direction across the ground which carries a crop to be harvested;
an engine and hydraulic pump mounted on the tractor for providing a pressurized fluid output;
a header having an elongate support structure arranged across a width of the tractor extending from one end of the header to an opposed end of the header;
the header including a cutter bar extending across a width of the header for cutting a standing crop as the header is moved over the ground;
the header including a feeding system for carrying the cut crop along the header frame for collecting at a discharge area of the header;
the header including a hydraulic header drive system for driving the cutter knife and the feed system;
a mounting assembly carrying the header at a position forward of the first end of the tractor frame so as to support the header in movement over the ground as the tractor frame is moved in the working direction;
the mounting assembly mounting the header on the tractor for movements of the header relative to the tractor at least in a first direction upwardly and downwardly and in a second direction of twisting movement where said one end of the header is movable upwardly and downward relative to said opposed end;
the mounting assembly being releasable for disconnection of the header from the tractor;
a flexible conduit assembly having one or more conduits having an extent from the tractor to the header for connecting the pressurized fluid from the tractor to the hydraulic header drive system;
and an arched channel member for supporting the conduit assembly in at least part of the extent from the tractor to the header;
the arched channel member including articulation components providing first movement about an upstanding axis and second movement about an axis transverse to said upstanding axis so as to accommodate movement of one end relative to the other end;
the conduit support member including support components providing support to the conduit assembly to prevent collapse thereof for disconnection of the header from the tractor at said mounting assembly.

According to a third aspect of the invention there is provided a crop harvesting machine comprising:
a tractor having longitudinally opposed first and second ends;
a driver cabin on the tractor;
ground wheels rotatably supported on the tractor frame for movement of the tractor in a working direction across the ground which carries a crop to be harvested;
an engine and hydraulic pump mounted on the tractor for providing a pressurized fluid output;

a header having an elongate support structure arranged across a width of the tractor extending from one end of the header to an opposed end of the header;

the header including a cutter bar extending across a width of the header for cutting a standing crop as the header is moved over the ground;

the header including a feeding system for carrying the cut crop along the header frame for collecting at a discharge area of the header;

the header including a hydraulic header drive system for driving the cutter knife and the feed system;

a mounting assembly carrying the header at a position forward of the first end of the tractor frame so as to support the header in movement over the ground as the tractor frame is moved in the working direction;

the mounting assembly mounting the header on the tractor for movements of the header relative to the tractor at least in a first direction upwardly and downwardly and in a second direction of twisting movement where said one end of the header is movable upwardly and downward relative to said opposed end;

the mounting assembly being releasable for disconnection of the header from the tractor;

a flexible conduit assembly having a plurality of conduits having an extent from the tractor to the header for connecting the pressurized fluid from the tractor to the hydraulic header drive system;

a manifold for disconnection of ends of a plurality of conduits of said conduit assembly from the tractor;

and a conduit support member for supporting the conduit assembly in part of the extent from the tractor to the header with a free portion of the conduit assembly extending beyond the conduit support member;

an end of the conduits at the manifold including at least one hand graspable handle member for manual lifting of the ends from the manifold;

wherein the conduit support member includes at least one bracket for receiving and supporting said at least one hand graspable handle member.

In some cases and to obtain the best advantage the tractor can be drivable in both directions with the first end forward and with the second end forward with the linkage arranged such that the header is towed behind the tractor as it moves in a direction opposite to the working direction with the first end at the rear. This allows a simple connection of the header to the tractor in the transport position since the header remains at the same end when working and when towed. However it is also possible to keep the header at the same end by pushing the header forward in the transport position. In this case it is likely that a support wheel for the outboard or forward end of the header will be steered to keep the header aligned with the front of the tractor.

In order to meet modern transport requirements over roads, it is preferable that the header is towed at a position located between a path of the first wheels as the tractor moves in a straight line, where this be towed or pushed. Of course when towed, the header will follow the tractor in the form of a trailer so that it will follow to one side as the tractor turns.

Typically the present arrangement as defined above is concerned with sickle headers where the crop transport system is a draper since such headers can be as much as 45 feet in length. In this case the header should be propelled along its length since any offset or angle will take it to an operating width greater than that allowed for road use. However the present invention is not limited to headers of such a length so that smaller headers may tolerate other angles and orientations of the header relative to the tractor.

Preferably the mounting system includes a lift system for up and down movement and a spring float system connecting the header to the lift system so as to allow up and down and floating movement of the header relative to the tractor. Where the linkage remains in place during the working operation, the linkage is thus preferably arranged and connected such that in the working position the linkage allows the up and down movement of the header and the floating movement of the header relative to the tractor. For this purpose, one preferred arrangement for effecting this action is to connect end of the linkage to the header by a connector member at the header which allows limited side to side movement of the end of the linkage and limited twisting movement of the end of the linkage about an axis parallel to the working direction.

In a preferred arrangement, the tractor is of the conventional type including an engine mounted on the tractor frame; at least one hydraulic pump driven by the engine for generating a source of hydraulic fluid under pressure for driving components of the tractor and components of the header when attached to the tractor; two driven wheels of the tractor mounted at the first end of the tractor; two non-driven castor wheels of the tractor mounted at the second end of the tractor and a cab mounted on the tractor frame at the first end. This is the type of tractor conventional used as a swather. However other constructions can be used.

In such conventional swather tractors there is provided an operator's seat and control assembly arranged for controlling driving movement of the tractor in both a first end forward position and in a second end forward position, the control assembly including a steering control and a speed control; wherein each of the driven wheels including a respective drive motor driven by hydraulic fluid from the at least one hydraulic pump; wherein the speed control is arranged to control a rate of supply of hydraulic fluid from the at least one hydraulic pump to the respective drive motor to control a common speed of rotation of the driven wheels and thus a speed of movement of the tractor; and wherein the steering control is arranged to control a differential in rate of supply of hydraulic fluid from the at least one hydraulic pump to the respective drive motor to control a relative speed of rotation of the driven wheels and thus a turning direction of the tractor.

Where the tractor is bi-directional, the tractor preferably includes a cab with an operator seat within the cab and wherein the operator seat is rotatable for driving the tractor in both directions with the first end forward and with the second end forward.

BRIEF DESCRIPTION OF THE DRAWINGS

One embodiment of the invention will now be described in conjunction with the accompanying drawings in which:

FIG. 3 is an isometric view of the machine in the position of FIG. 1.

FIG. 4 is a side elevational view of the header in the position of FIG. 2 and showing the hose management device in the stored position.

FIG. 5 is a side elevational view of the header in the position of FIG. 1 and showing the hose management device in the connected position.

In the drawings like characters of reference indicate corresponding parts in the different figures.

DETAILED DESCRIPTION

Figure 1:
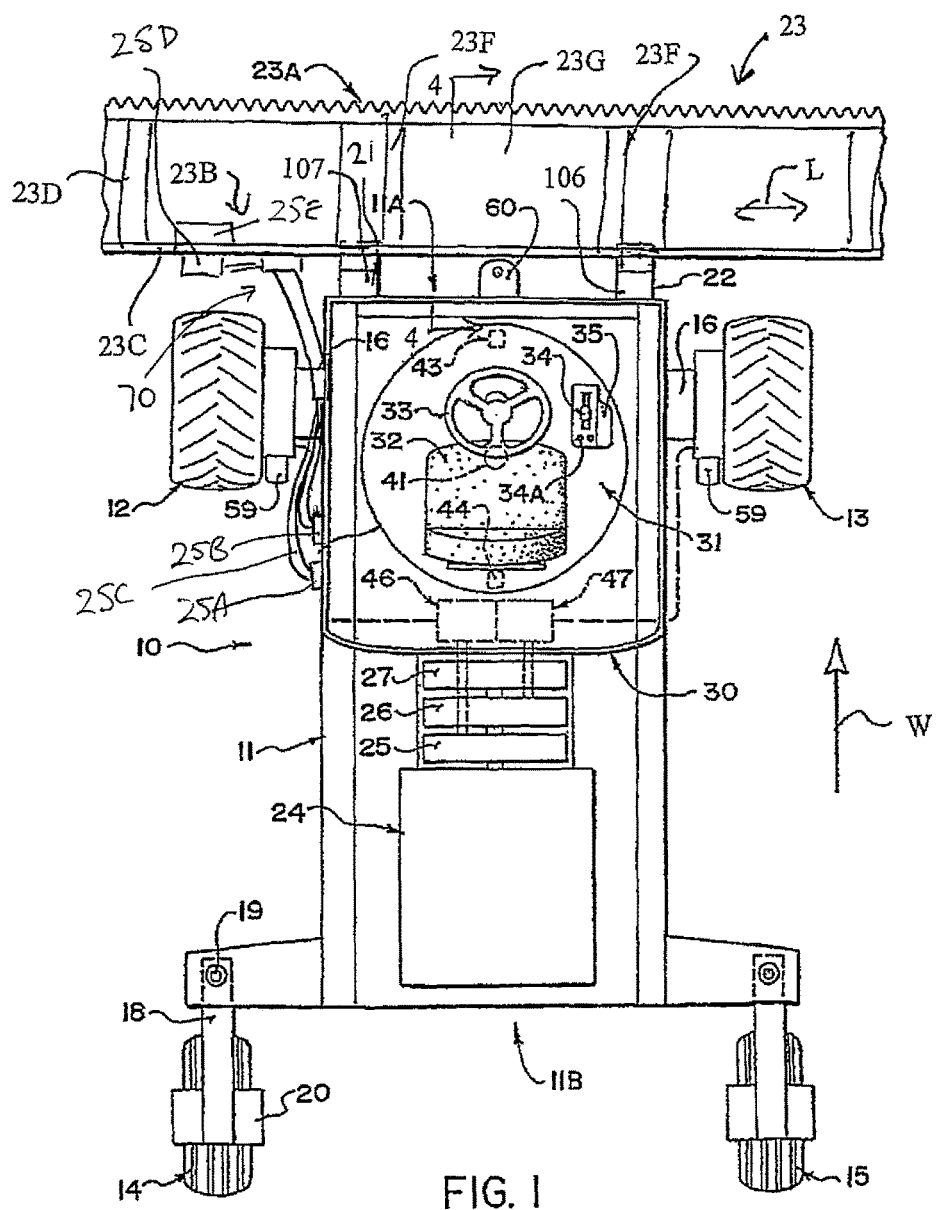
FIG. 1 is a schematic top plan view partly in phantom and partly broken away showing a crop harvesting machine in a field operating position and including a hose management device according to the present invention.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependent upon the rate of flow of the hydraulic fluid.

The wheels 14 and 15 are mounted on conventional castors 18 which swivel about a castor pin 19. The ground wheels 14 and 15 are non-driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes the mounting system 21, 22 which is operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components. The pumps communicate with the manifolds 25A and 25B located on the frame of the tractor behind the wheel 12 for connection to supply hoses 25C drive fluid to the header at a manifold 25D.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch 35A, a reel height and forward location control by way of a four way (two axis) switch 35B and a reel speed control two way one axis switch 35C so that the skilled operator can control the parameters of the header during the working action. The header is engaged by a main drive control lever 35D in many cases also be reversed in the event of a blockage and thus will include a switch 35E for allowing such reversal. Thus the console has in it the ground speed lever (on which the handle houses the header height/angle switches, reel height/fore-aft switches, reel speed control switch and display control switch), engine throttle control, speed range switch, the display module (which includes a variety of switches to control the header) etc.

Figure 2:
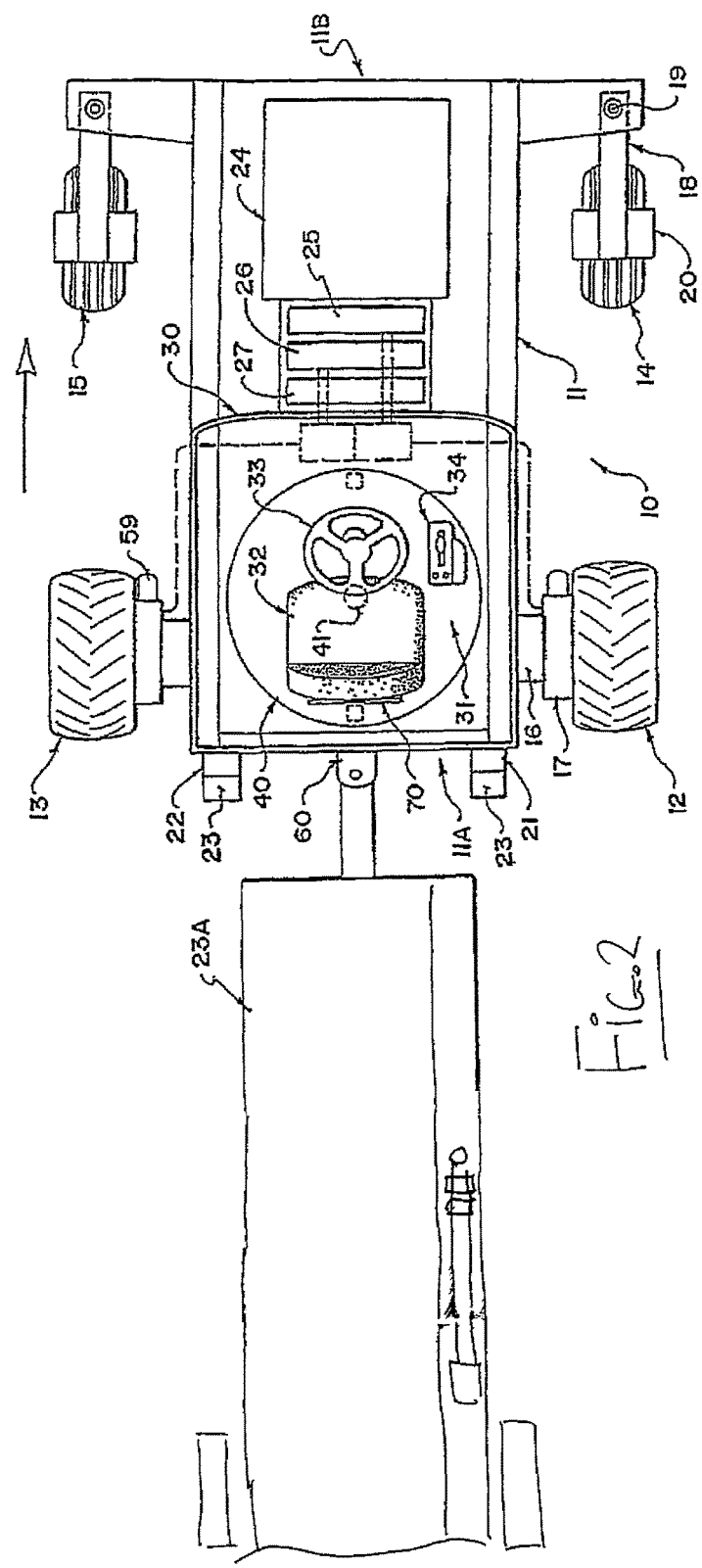
FIG. 2 is a top plan view similar to that of FIG. 1 showing the machine in the towing position with the hose management system in stored position.

The operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIGS. 2 and 3 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

In transportation, it is intended therefore that the operator's console is moved to the engine forward position and that the tractor moves forward rapidly at high speed in the transport position at a speed significantly higher than can be achieved in current tractors of this type. When the header is of a relatively narrow width, this header can remain in place and is simply carried behind the tractor. In a situation where the header is of significant width greater than can be accommodated in a road width, the header is disconnected from the supports 21 and 22 and is instead trailed on wheels attached to a hitch 60 at the end 11A of the tractor.

Thus the tractor includes an engine 24 mounted on the tractor frame, at least one hydraulic pump 25, 26, 27 driven by the engine 24 through a transmission for generating a source of hydraulic fluid under pressure for driving components of the tractor and components of the header when attached to the tractor. In particular the hydraulic pumps generate fluid which is controlled by controls 46, 47 to supply fluid under pressure to two driven wheels 12, 13 of the tractor mounted at the first end of the tractor. Speed control and steering control; are provided by the controls 46, 47 in either direction of travel of the tractor. Two non-driven castor wheels 14, 15 of the tractor are mounted at the second end of the tractor. A cab 30 is mounted on the tractor frame at the first end.

There is provided an operator's seat 32 and control assembly 34 arranged for controlling driving movement of the tractor in both a first end forward position and in a second end forward position, the control assembly including a steering control 33 and a speed control 34. Each of the driven wheels 12, 13 includes a respective drive motor 17 driven by hydraulic fluid from the at least one hydraulic pump 25, 26 wherein the speed control 34 is arranged to control a rate of supply of hydraulic fluid from the at least one hydraulic pump to the respective drive motor to control a common speed of rotation of the driven wheels and thus a speed of movement of the tractor. The steering control 33 is arranged to control a differential in rate of supply of hydraulic fluid from the hydraulic pump to the respective drive motor 17 to control a relative speed of rotation of the driven wheels 12, 13 and thus a turning direction of the tractor.

The header 23 includes an elongate header frame 23B defined by a main beam 23C and forwardly extending legs 23D which carry a cutter bar 23A. The cutter extends longitudinally along the front cutter bar of the header frame for cutting the crop when the header is moved in a working direction W generally at a right angle to its longitudinal direction L. Different types of cutter can be used but the typical example comprises a sickle knife. A crop transport system 23F, generally drapers but other systems can be used, is provided for transporting the crop longitudinally of the header to a central discharge opening 23G of the header so as to form a swath to be deposited on the ground between the wheels 12, 13 of the tractor.

The mounting assembly carrying the header at the forward position at the first end of the tractor supports the header in movement over the ground as the tractor is moved in the working direction. The mounting assembly 21, 22 mounts the header on the tractor for movements of the header relative to the tractor in corrections both upwardly and downwardly and in twisting movement where one end of the header is moved upwardly and downwardly relative to the other end and vice versa. The header can also tilt forwardly and rearwardly on the support arms 21, 22 by a tilting movement actuated typically by a centre actuation cylinder (not shown). Such movements are typically floating movements in that the mounting assembly 21, 22 includes springs or float action so that the header can move upwardly and downwardly and can twist depending upon ground contour. However in some cases control the movement of the header can also be provided. In some cases the header floats with the cutter bar on the ground and the cases are gauge wheels are provided, depending upon crop requirements.

The mounting assembly 21, 22 is also releasable for disconnection of the header from the tractor so that the header can be located in the trailed position relative to the tractor to be towed by the tractor on ground wheels provided on the header attached to the header. However the present invention does not require that the header be moved to a transport position since the header can simply be disconnected for storage or can be transported on a conventional trailer by the tractor depositing the header on to the trailer before disconnection. In all cases it is required that the header be disconnected from the tractor at the mounting assembly 21, 22.

As previously described the pump 25 communicates fluid to manifolds at 25A, 25B for communication of fluid to the hydraulic drive system 25E of the header through the hoses 25C and the manifold 25D. The hoses thus provide a flexible conduit assembly having at least one hose and typically a series of hoses having an extent from the tractor for connecting the pressurised fluid from the tractor to the hydraulic drive system.

The arrangement of the present invention provides a conduit support member 70 for supporting the hoses or conduits of the conduit assembly in at least part of their extent from the tractor to the header.

The conduit support member 70 is shown best in FIG. 3 and comprises a base member 71 mounted on the main support beam 23C of the header at a fixed position which is maintained attached to the header at all times. On top of the base member 70 is mounted a swivel member 72 which can rotate about a vertical swivel pin 73 so as to provide a clevis 74 at the top of the swivel member 72 and so as to provide a base 75 of the swivel member 72. The clevis 74 can therefore rotate about the vertical axis of the pin 73 so as to allow the arm to rotate about the axis of the pin.

The further includes a first portion 76 and a second portion 77 which together generally form an arch extending from the clevis 74 to an outer end of the second portion 77 at the end 78. The first portion 76 is pivotally mounted on the clevis at a pivot pin 79 generally orthogonal or right angles to the pin 73 little movement of the first portion about a generally horizontal axis. The second portion 77 is pivotally mounted on the outer end of the first portion at a second pin 80 parallel to the first pin 79 so that the first portion can move upwardly and downwardly and the second portion can also pivot upwardly and downwardly relative to the outer end of the first portion.

The conduit support member 70 is therefore connected at one end to the header and is connected at the other end to a releasable coupling 81 at the end 78 of the second portion. The conduit support member 70 includes the articulation components provided by the pin 73 and the pivot pins 79 and 80 which allow articulation of the end 78 relative to the fixed end 71 so as to accommodate the movements of the header relative to the tractor.

The conduit support member 70 further includes support components 82A and 83A providing support to the conduit assembly 25C to prevent collapse of the conduit assembly when the conflicts are disconnected from the manifolds 25A and 25B, that is when the end 78 is disconnected from the coupling 81.

The coupling 81 includes a ball joint which allows the end 78 to swivel in all directions relative to the fixed point on the tractor. The coupling 81 is outside surface of the wheel strut 16 of the tractor which is a suitable position relative to the main beam of the header and relative to the manifolds at 25A, 25B. The end 78 of the arm carries a depending rod 82 which carries the ball of the ball and socket coupling providing the connection between the end 78 and the bracket 81. The ball and socket coupling can be disconnected only suitable location to separate the end 78 from the bracket 81.

The end 78 is separated from the manifolds 25A and 25B by a free floating portion 25F of the conduits which are disconnected using conventional connection systems from the manifolds. Each of the manifold couplings 86 and 87 can be moved to a respective bracket 92, 93 on the second portion 77 of the support arm. Each of the brackets comprises a pair of upstanding lugs with a slot 94 for receiving the transverse bar which acts as a handle and is draped over the slot slide into the slot to hold and support the in the couplings 86 and 87 after their disconnection. In this way the operator when disconnecting the header can firstly separate the connectors 86 and 87 and can move them to the draped position at the brackets 92, 93. The heavy hoses are therefore firstly supported wholly by the arm 70 including the portion attached to the arm and the free end portion 25F.

The conduit support 70 or arm includes a flat base 97 and two upstanding sides 95, 96 forming an arched channel having a width sufficient to receive the series of hoses. The bracket 92 and 93 form extensions the sidewalls extending upwardly from the top of the sidewalls. A further bracket 98 is located on the first portion 76 so as to carry a relief valve 99 that is provided for windrowers in the knife circuit.

The support components 82A and 83A, each comprise a pair of gas springs which provide a resistance to collapse. That is the gas springs can be expanded and collapsed by pressure from the operator but tend to hold the first portion 76 at a fixed position to the bracket and to hold the second portion 77 at a fixed position relative to the first portion 76. In this way when the coupling 81 is disconnected after the hoses are hung on the brackets 92 and 93, the conduit support member or arm remains in supported position against collapse. The operator is required to manually support the hoses when disconnected since they remain supported by the arm. The operator can then twist the arm about the vertical pivot pin 73 to the position shown in FIG. 4 where the end 78 of the arm is located on a bracket 81A identical in construction to the bracket 81. In this position the hoses are maintained correctly supported on the header alone by the connection at one end by the base 71 to the main and at the other end other end to the bracket 81A. The bracket 81A bus forms a releasable coupling on the header for receiving and locating the other end of the conduit support member 70 when disconnected from the tractor.

When the hoses are disconnected from the tractor, the header can be disconnected from the tractor using conventional systems. The header can be moved to transport position or can be deposited on the ground for storage. In some cases the header can be placed onto a trailer. It will be understood that these arrangements are not part of the present invention where the present arrangement is provided for management of the heavy hoses to allow the operator to manage the disconnection of the header from the tractor with a low level of manual labour involved in the disconnection procedure.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A crop harvesting machine comprising:
    a tractor having a front and a rear with the front arranged forward of the rear when moving in a working direction;
    a driver cabin on the tractor;
    ground wheels rotatably supported on the tractor frame for movement of the tractor in the working direction across the ground which carries a crop to be harvested;
    an engine and hydraulic pump mounted on the tractor for providing a pressurized fluid output;
    a header having an elongate support structure arranged across the front of the tractor extending from one end of the header to an opposed end of the header;
    the header including a cutter system extending across a width of the header for cutting a standing crop as the header is moved over the ground;
    the header including a hydraulic header drive system for driving at least the cutter system;
    a mounting assembly carrying the header at a position forward of the front of the tractor so as to support the header in movement over the ground as the tractor is moved in the working direction;
    the mounting assembly including linkages mounting the header on the tractor for movements of the header relative to the tractor at least in a first direction upwardly and downwardly and in a second direction of twisting movement where said one end of the header is movable upwardly and downward relative to said opposed end of the header;
    the mounting assembly being releasable for disconnection of the header from the tractor;
    a flexible conduit assembly having one or more conduits having an extent from the tractor to the header for connecting the pressurized fluid from the tractor to the hydraulic header drive system;
    and a conduit support member for supporting the conduit assembly in at least part of the extent from the tractor to the header;
    the conduit support member being connected by a rear connection member at a rearward end of the conduit support member to the tractor;
    the conduit support member being connected by a front connection member at a forward end of the support conduit member to the header;
    one of the front and rear connection members forming a releasable coupling for disconnection of the conduit support member from either the tractor or the header;
    the conduit support member including articulation components providing articulation of said forward end of the conduit support member relative to the rearward end of the conduit support member so as to accommodate said movements of the header relative to the tractor;
    the conduit support member including support components providing support to the conduit assembly to prevent collapse thereof when said releasable coupling is disconnected.

2. The crop harvesting machine according to claim 1 wherein said one or more conduits comprises a plurality of conduits and wherein the conduit assembly includes a manifold or individual couplers for disconnection of ends of said plurality of conduits of said conduit assembly.

3. The crop harvesting machine according to claim 2 wherein the conduit assembly includes a portion of said plurality of conduits extending freely beyond said releasable coupling.

4. The crop harvesting machine according to claim 3 wherein the conduit support member includes at least one bracket for supporting the ends of said plurality of conduits when disconnected.

5. The crop harvesting machine according to claim 4 wherein said at least one bracket comprises a plurality of separate brackets at spaced positions on the conduit support member each for a receiving a respective one of said ends of the plurality of conduits.

6. The crop harvesting machine according to claim 5 wherein each of said ends of the plurality of conduits includes a hand graspable handle member and wherein each of the brackets is arranged to receive the hand graspable handle member.

7. The crop harvesting machine according to claim 6 wherein the hand graspable handle member comprises a transverse bar and wherein the bracket defines a slot into which the bar engages.

8. The crop harvesting machine according to claim 1 wherein the releasable coupling comprises a ball joint.

9. The crop harvesting machine according to claim 1 wherein the articulation components provide pivot members pivotal about two orthogonal axes.

10. The crop harvesting machine according to claim 1 wherein the articulation components provide a mounting base, a first portion of the conduit support member extending from the mounting base and pivotal relative thereto about a first transverse axis and a second portion connected at a distal end of the first portion and pivotal relative thereto about an axis parallel to the first axis.

11. The crop harvesting machine according to claim 1 wherein the conduit support member comprises a channel within which said one or more conduits sit.

12. The crop harvesting machine according to claim 1 wherein the conduit support member is arched.

13. The crop harvesting machine according to claim 1 wherein the conduit support member is connected between a main beam of the header and a front wheel support strut of the tractor.

14. The crop harvesting machine according to claim 1 wherein the support components comprise damper members which provide a resistance to collapse.

15. The crop harvesting machine according to claim 14 wherein the damper members are gas shock absorbers.

16. The crop harvesting machine according to claim 1 wherein said releasable coupling is located at the rearward end at the tractor and the conduit support member is permanently connected at said forward end to the header.

17. The crop harvesting machine according to claim 16 including a releasable holder on the header for receiving and locating the rearward end of the conduit support member when disconnected from the tractor.

18. The crop harvesting machine according to claim 1 wherein the conduit support member comprises an arched channel member.

19. The crop harvesting machine according to claim 16 wherein an end of said one or more conduits at the tractor includes a hand graspable handle member for manual lifting of said end of said one or more conduits and wherein the conduit support member includes at least one bracket for receiving and supporting said hand graspable handle member.

* * * * *